United States Patent [19]

Tallon et al.

[11] Patent Number: 5,107,697
[45] Date of Patent: Apr. 28, 1992

[54] TRACER GAS LEAK DETECTION SYSTEM

[75] Inventors: Jacques Tallon; Gilles Baret, both of Annecy, France

[73] Assignee: Alcatel Cit, Paris, France

[21] Appl. No.: 600,936

[22] Filed: Oct. 22, 1990

[30] Foreign Application Priority Data

Oct. 23, 1989 [FR] France ............... 89 13827

[51] Int. Cl.$^5$ ............................................. G01M 3/20
[52] U.S. Cl. ................................................. 73/40.7
[58] Field of Search ..................................... 73/40.7

[56] References Cited

U.S. PATENT DOCUMENTS

| | | | |
|---|---|---|---|
| 3,690,151 | 9/1972 | Briggs | 73/40.7 |
| 4,776,207 | 10/1988 | Holme | 73/40.7 |
| 4,779,449 | 10/1988 | Bley et al. | 73/40.7 |
| 4,919,599 | 4/1990 | Reich et al. | 73/40.7 X |
| 4,984,450 | 1/1991 | Bürger | 73/40.7 |

FOREIGN PATENT DOCUMENTS 2606509 5/1988 France .
126733 10/1981 Japan .................... 73/40.7

OTHER PUBLICATIONS

Patent Abstracts of Japan, vol. 7, No. 15 (P-169) [1160], Jan. 21, 1983; JP-A-57 169 647 (Nippon Shinku Gijutsu K.K.), Oct. 19, 1982.
IRE Tractions on Electron Devices, vol. ED5, No. 1, Jan. 1958, pp. 23–34; J. Lineweaver: "Leak detection-ultrasensitive technique employing the helium leak detector".

*Primary Examiner*—Hezron E. Williams
*Assistant Examiner*—Joseph W. Roskos
*Attorney, Agent, or Firm*—Sughrue, Mion, Zinn, Macpeak & Seas

[57] ABSTRACT

A tracer gas leak detection system for: a first duct provided with a pre-evacuation valve, enabling a test chamber to be connected to the suction of a pre-evacuation pump. A gas analyzer is connected to the suction of a mechanical secondary pump whose delivery is connected by a second duct to a primary pump. At least one connection is provided with an inlet valve connecting of the text chamber to the mechanical secondary pump and the system further includes a second mechanical secondary pump situated on the first duct downstream from the pre-evacuation valve.

3 Claims, 1 Drawing Sheet

TRACER GAS LEAK DETECTION SYSTEM

The present invention relates to a tracer gas leak detection system comprising: a first duct provided with a pre-evacuation valve and enabling a test chamber to be connected to the suction of a pre-evacuation pump; a gas analyzer connected to the suction of a mechanical secondary pump whose delivery is connected by a second duct to a primary pump; and at least one connection provided with an inlet valve connecting said chamber to said mechanical secondary pump.

BACKGROUND OF THE INVENTION

Several pumping circuits or dispositions are known that correspond to such a leak detection system.

Firstly there is a circuit in which the pre-evacuation pump and the primary pump are distinct, each generally being constituted by a vane pump.

In other assemblies, the pre-evacuation pump for the test chamber and the primary pumping system situated at the delivery of the secondary mechanical pump are constituted by a common pump with a valve being disposed between said common pump and the delivery of the secondary pump, or else a three-way valve system is provided for enabling the common pump to be connected either to the delivery of the secondary pump, or else to the first duct leading to the test chamber.

Under these circumstances, prior assemblies are capable of operating either in direct flow or in counterflow, or else of operating selectively in direct flow or in counter flow, For direct flow operation, the suction of the secondary pump is connected to the test chamber via an inlet valve. For countercurrent operation there is a connection including a valve suitable for connecting the delivery of the secondary pump to the test chamber.

Which ever configuration is used, it takes a long time to pre-evacuate the part under test when its volume is large. At less than $10^{-1}$ mb, the flow rate through a primary vane pump is relatively low. Unfortunately, the valve connecting the chamber under test to the secondary pump can be opened only after the press has dropped down at least to $10^{-2}$ mb.

In addition, throughout the possibly long period that the chamber is being pre-evacuated under molecular conditions, there is always the risk of the chamber being polluted by oil from the primary pump.

A helium memory phenomenon exists in configurations having a single primary pump, with this phenomenon being due to the vane primary pump whenever a prior test has caused a large leak to be detected. This phenomenon disturbs the results of the following tests.

The object of the present invention is to mitigate these drawbacks and it also has the advantage of reducing the signal "background noise" that exists in such a detection system.

SUMMARY OF THE INVENTION

The invention thus provides a tracer gas leak detection system as defined above, and further including a second mechanical secondary pump situated on said first duct, upstream from said pre-evacuation valve.

BRIEF DESCRIPTION OF THE DRAWING

Embodiments of the invention are described by way of example with reference to the accompanying drawing, in which.

DETAILED DESCRIPTION

Figure 1:
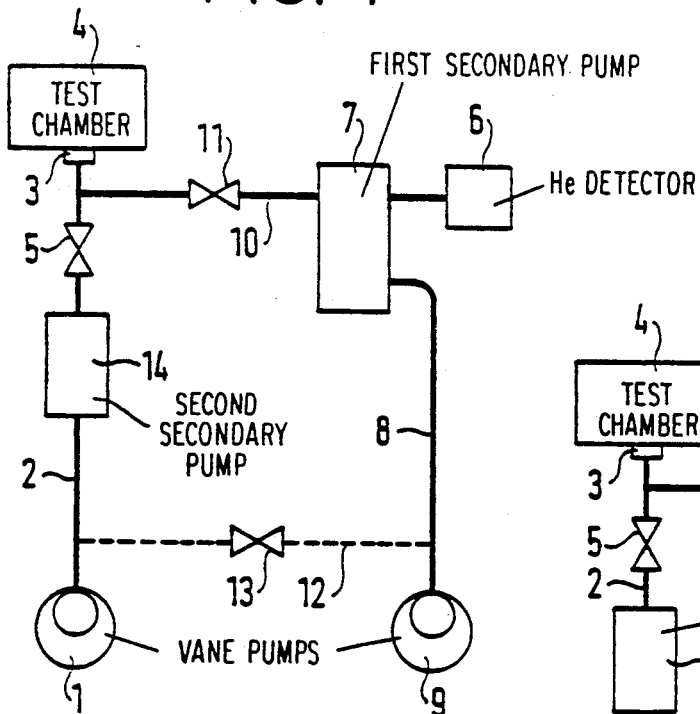
FIG. 1 shows a tracer gas leak detection system of the invention when two distinct vane pumps are used.

With reference to FIG. 1, the tracer gas leak detection system comprises a pre-evacuation pump 1, e.g. a vane pump. The suction of the vane pump 1 is connected to a first duct 2 whose other end is connected via an inlet flange 3 to a chamber to be tested 4. The first duct 2 is provided with a pre-evacuation valve 5. A gas analyzer 6 such as a mass spectrograph adjusted on helium, for example, is connected to the suction end of a secondary mechanical pump 7. This pump is constituted by a turbomolecular or "molecular drag" type molecular pump, for example, but other types of pump could also be used, e.g. a Holweck pump or a hybrid pump.

The delivery from the secondary pump 7 is connected via a second duct 8 to a primary pump 9 such as a vane pump.

In addition, the chamber under test 4 is connected to the suction of the secondary pump 7 via a connection 10 provided with an inlet valve 11.

This connection makes it possible to perform a direct flow test.

Further, the system may optionally include another connection 12, likewise provided with a "inlet" valve 13 which directly connects the outlet from the secondary pump 7 to the chamber under test 4 via the first duct 2. The connection 12 serves to perform a counterflow test.

In accordance with the invention, a mechanical secondary pump 14 is situated on the first duct 2 upstream from the pre-evacuation valve 5.

The connection 12 meets the first duct 2 upstream from the pump 14. The second secondary mechanical pump 14, e.g. a turbomolecular or "molecular drag" type pump, serves to reduce the inlet pressure quickly by taking advantage of the high pumping speed of a molecular type pump at less than $10^{-1}$ mbar, which is in contrast to the performance of vane pumps at such pressures.

It is thus possible to obtain a limiting pressure of about $10^{-5}$ mbar (much less than the $10^{-2}$ mbar previously achievable in the prior art), thus giving rise to better elimination of the helium contained in the air during the pre-evacuation stage, thereby reducing signal "background noise".

Another advantage consists in the second secondary pump 14 preventing oil diffusing back from the pump 1, thus providing a clean detector.

Finally, when operating under direct flow conditions, the helium memory phenomenon due to the pump 1 is reduced by the pump 14.

By way of example, the pumps 7 and 14 may be turbomolecular pumps having a flow rate of 100 liters per second (l/s). The pump 9 may be a vane pump having a flow rate of 4 cubic meters per hour (m³/h), and the pre-evacuation pump 1 may have a flow rate of 20 m³/h.

During a direct flow operation test, and after pre-evacuation has been performed by the pumps 1 and 14, the valves 5 and 13 are closed and the valve 11 is opened. A maximum sensitivity of $10^{-11}$ atm cm³/s is obtained with a pumping speed of 8 l/s.

When measuring a large leak, counterflow operation is used: the valve 11 remains closed, and after the chamber 4 has been pre-evacuated, the valve 13 is opened. It is thus possible to operate at a higher pressure (greater than $10^{-2}$ mb) with a pumping speed of 15 l/s.

In order to inspect large volumes that may be as much as 200 liters, for example, it is possible to perform a "clean test" by leaving both the valves 11 and 13 open simultaneously. Sensitivity is reduced by a factor of three, but the helium pumping speed is raised to 23 l/s, thereby improving response time.

Figure 2:
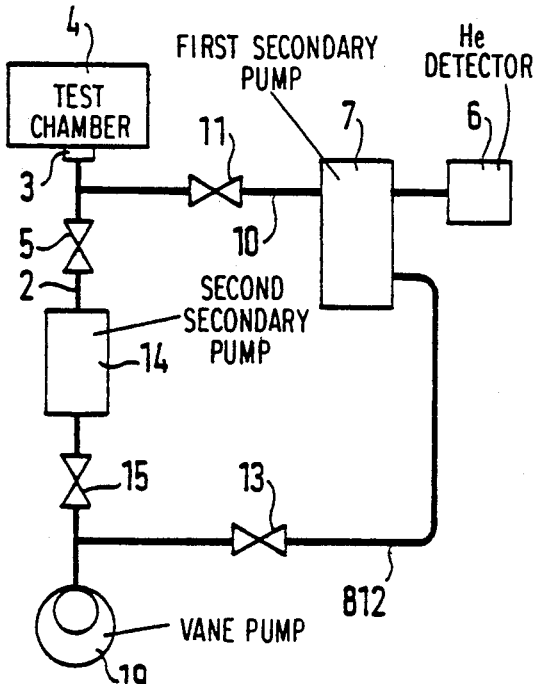
FIG. 2 shows a detection system of the invention when only one vane pump is used.

FIG. 2 shows a simplified configuration in which one of the vane pumps is omitted, and the sole remaining vane pump (referenced 19) performs the functions of the two pumps 1 and 9 of FIG. 1. An additional valve 15 is added.

During pre-evacuation, the valves 5 and 15 are opened while the valves 11 and 13 are closed.

During a direct flow test, the valves 5 and 15 are closed while the valves 11 and 13 are opened.

During a counterflow test, the valve 11 remains closed while all three valves 5, 15, and 13 are opened.

Figure 3:
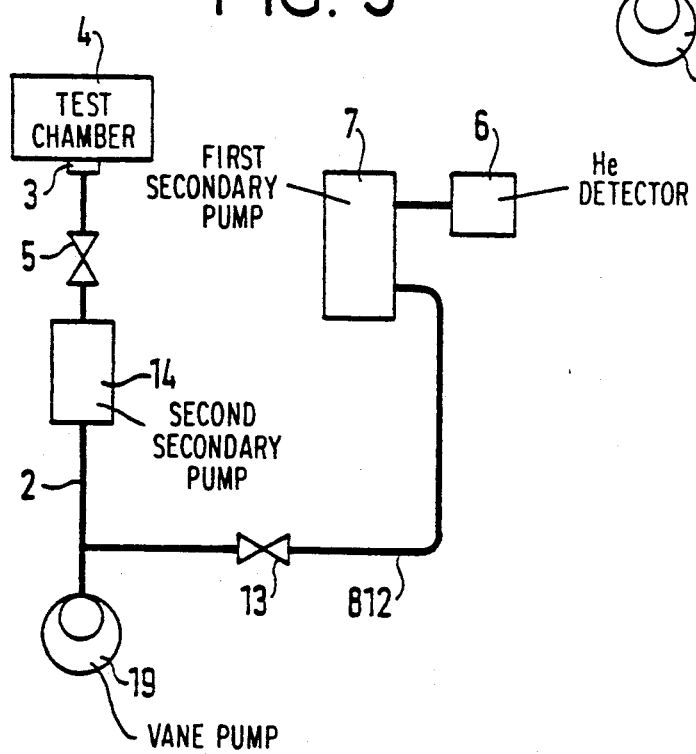
FIG. 3 shows a third variant having a single vane pump and capable of operating only in counterflow.

Finally, FIG. 3 shows a configuration which is capable of counterflow operation only.

In these last two configurations, reference 812 designates the single duct which simultaneously performs the functions of the second duct 8 in FIG. 1 and of the connection 12 also in FIG. 1. In FIGS. 2 and 3, the vane pump 19 has a flow rate that corresponds to that of pump 1 in FIG. 1, i.e. 20 m$^3$/h in the non-limiting example described.

By using this detection system, apparatuses are now available having better performance than the best diffusion pump apparatuses using liquid nitrogen traps. Such performance was previously not achievable using mechanical molecular pump apparatuses in prior configurations.

Results achieved:

high sensitivity $10^{-11}$ atm cm$^3$/s;

high pumping:

8 l/s for small leaks;

15 l/s for large leaks; or 23 l/s for rapid searching for leaks on large volumes;

a clean detection system; and reduced helium memory.

The present specification uses the term "detection system" rather than "detector" since the invention is applicable to any detection system comprising the components described, it being possible to bring these components together in an apparatus that could be called a "detector", but under other circumstances the apparatus may include only some of the components, thereby making it possible to provide detectors which are smaller and lighter, for example if the volume to be inspected possesses its own pumping equipment.

We claim:

1. A tracer gas leak detection system comprising: a first duct provided with a pre-evacuation valve and enabling a test chamber to be connected to the suction of a pre-evacuation pump; a gas analyzer connected to the suction of a first mechanical secondary pump whose delivery is connected by a second duct to a primary pump; and at least one connection provided with an inlet valve connecting said chamber to said mechanical second pump, wherein the system further includes a second mechanical secondary pump situated on said first duct, downstream from said pre-evacuation valve and wherein said connection provided with an inlet valve is a connection provided with a valve connecting said chamber to the suction of said first mechanical secondary pump.

2. A leak detection system according to claim 1, further including another connection provided with a valve directly connecting the delivery of the first-mentioned mechanical secondary pump to said first duct leading to the chamber under test, downstream from said second mechanical secondary pump.

3. A leak detection system according to claim 2, wherein said pre-evacuation pump and said primary pump are common and constitute a single primary pumping unit, and said system further comprising a valve between said single primary pumping unit and said second mechanical secondary pump and a valve between said single primary pumping unit and said first mechanical secondary pump.

* * * * *